(12) United States Patent
Sakamoto et al.

(10) Patent No.: US 7,578,610 B2
(45) Date of Patent: Aug. 25, 2009

(54) LIGHT SOURCE DEVICE AND LIQUID DISPLAY DEVICE

(75) Inventors: Takuya Sakamoto, Kumamoto (JP); Seiji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/624,488

(22) Filed: Jan. 18, 2007

(65) Prior Publication Data

US 2007/0165425 A1 Jul. 19, 2007

(30) Foreign Application Priority Data

Jan. 19, 2006 (JP) .............................. 2006-010890

(51) Int. Cl.
*F21V 19/00* (2006.01)

(52) U.S. Cl. ...................... 362/634; 362/632; 362/633; 362/97; 349/69; 349/58

(58) Field of Classification Search ......... 362/632–634, 362/630–631, 613, 249, 288, 240, 219, 225, 362/231–234, 612, 97.1, 97.3; 349/58, 60, 349/65, 67, 70
See application file for complete search history.

(56) References Cited

U.S. PATENT DOCUMENTS

| 6,776,504 | B2 * | 8/2004 | Sloan et al. | 362/240 |
| 6,905,224 | B2 * | 6/2005 | Yoo et al. | 362/225 |
| 2004/0156183 | A1 * | 8/2004 | Kim | 362/31 |
| 2006/0039163 | A1 * | 2/2006 | Yun | 362/600 |
| 2006/0139919 | A1 * | 6/2006 | Choi et al. | 362/240 |
| 2007/0008723 | A1 * | 1/2007 | Hampton | 362/240 |

FOREIGN PATENT DOCUMENTS

| JP | 2002-229022 | 8/2002 |
| JP | 2003-76287 | 3/2003 |
| JP | 2003-132725 | 5/2003 |
| JP | 2005-78832 | 3/2005 |

OTHER PUBLICATIONS

U.S. Appl. No. 11/623,909, filed Jan. 17, 2007, Seiji Sakai, et al.
U.S. Appl. No. 11/623,961, filed Jan. 17, 2007, Sakai.
U.S. Appl. No. 11/624,488, filed Jan. 18, 2007, Sakamoto et al.

* cited by examiner

*Primary Examiner*—Jacob Y Choi
*Assistant Examiner*—Robert May
(74) *Attorney, Agent, or Firm*—Oblon, Spivak, McClelland, Maier & Neustadt, P.C.

(57) ABSTRACT

A light source unit includes: a light source board mounted with a light source; a case that houses the light source board; and a holding member that is disposed integrally with an inner wall of the case, and hold the light source board with the case.

13 Claims, 13 Drawing Sheets

LIGHT SOURCE DEVICE AND LIQUID DISPLAY DEVICE

CROSS-REFERENCE TO RELATED APPLICATIONS

This application is based upon and claims the benefit of priority from Japanese Patent Application No. 2006-010890, filed on Jan. 19, 2006, the entire contents of which are incorporated herein by reference.

BACKGROUND OF THE INVENTION

1. Field

The present invention relates to a light source unit that emits light and a liquid crystal display device using the same.

2. Description of the Related Art

A liquid crystal display device includes a liquid crystal panel, a circuit board, a light source unit, etc. Light source units for applying light to the liquid crystal panel are classified into the side light type (also called the edge light type) and the direct type. In the light source unit of the side light type, a light source is disposed adjacent to a side surface of a case. In the light source unit of the direct type, a light source is disposed on the bottom surface of a case so as to be opposed to the liquid crystal panel. Some of the light source units of the side light type employ a light guide plate for guiding the light emitted from the light source to the opening of the case. In the light source unit using the light guide plate, the light emitted from a side light unit that incorporates a linear light source such as a cold cathode tube or point light sources such as a light emitting diode (LED) is reflected within the light guide plate and diffused by a diffusion pattern provided in the light guide plate, whereby the light can be taken out from the opening in a planar manner.

In general, to increase the luminance of the display screen, in the light source units using point light sources such as light emitting diodes as light emitting elements, the arrangement density of light emitting elements is increased by increasing their number or increasing the current supplied to each point light source. In either case, the temperature of portions around the point light sources is increased by heat that is generated by the individual point light sources which are emitting light. There have been proposed a light source unit including a light source board mounted with point light sources and provided with a wiring pattern for supplying power to the individual point light sources, and a heat radiating means (For example, JP-A-2002-229022, JP-A-2003-076287). Capable of increasing the heat radiation, these light source units allow increase in the arrangement density of point light sources or the current supplied to each point light source.

To output uniform light the light emitted from the point light sources through the light guide plate in a planar manner, the diffusion pattern provided in the light guide plate is formed in an optimum manner. Therefore, to prevent positional deviation between the light source board and the diffusion pattern, it is necessary to fix the light source board which is mounted with the point light sources using a positioning jig, screws, an adhesive (e.g., double-sided adhesive tapes), or the like.

In the above-described light source units, the arrangement density of light sources or the current supplied to each light source is increased by providing the heat radiation member for radiating heat generated by the light sources. However, the heat radiation member makes it difficult to reduce the width of a frame or the thickness of the light source unit, and the number of components increases.

Where the light source board mounted with the light sources is fixed with screws, spaces for screw heads are needed and the frame thickness needs to be increased for attachment of the screws. This makes it difficult to reduce the width of a frame or the thickness of the light source unit, and the number of components increases.

Where the light source board which is mounted with the light sources is fixed with an adhesive (e.g., by using double-sided adhesive tapes), the adhesive may peel off as time elapses due to influence of heat etc., which is not able to provide sufficient reliability.

Where the light guide plate is used, if the position of the light source board which is mounted with the light sources is deviated, it no longer conforms to a prescribed diffusion pattern, which results uniform distributed light in a planar manner cannot be output.

SUMMARY OF THE INVENTION

An object of the invention is to provide a light source unit that allows a light source board mounted with light sources to be held by a case with almost no increase in the number of components and makes it possible to reduce the width of a frame or the thickness of the case, as well as a liquid crystal display device having such a light source unit.

According to an aspect of the invention, a light source unit includes: a light source board mounted with a light source; a case that houses the light source board; and a holding member that is disposed integrally with an inner wall of the case, and hold the light source board with the case.

The light source unit according to the above aspect of the invention allows a light source board to be held by a case with almost no increase in the number of components and hence can reduce the width of a frame or the thickness of the light source unit.

DETAILED DESCRIPTION OF THE PREFERRED EMBODIMENT

Embodiments of the present invention will be hereinafter described with reference to the drawings.

Embodiment 1

Figure 1:
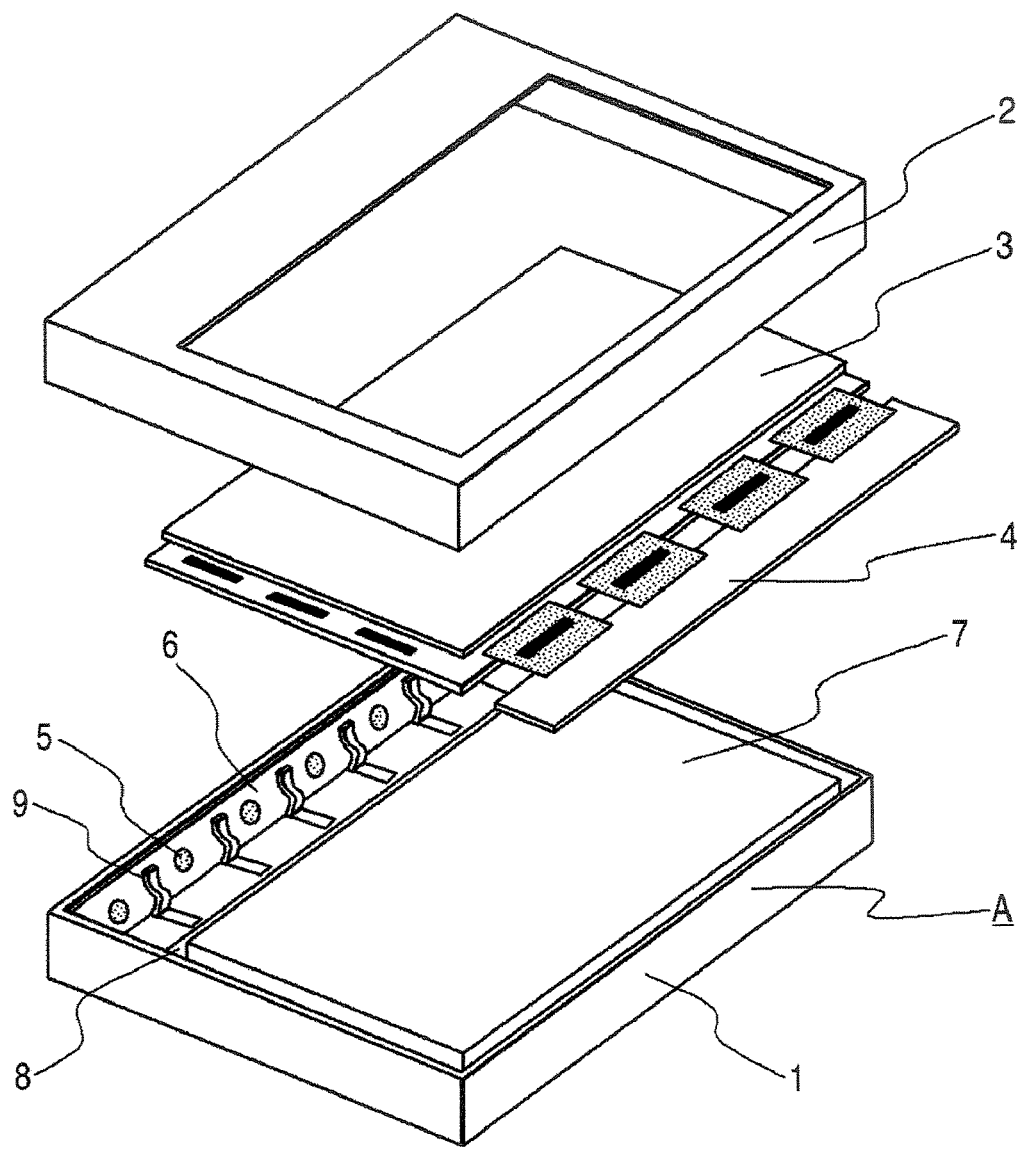
FIG. 1 is an exploded perspective view showing a general configuration of a liquid crystal display device according to a first embodiment of the invention.

FIG. 1 is an exploded perspective view showing a general configuration of a liquid crystal display device according to a first embodiment of the invention. In the drawings, the same or equivalent portions are denoted by the same reference symbol.

As shown in FIG. 1, the liquid crystal display device includes a case A that contains a back frame 1 and a front frame 2, a liquid crystal panel 3 for forming an image on the basis of a video signal, a circuit board 4 for driving and controlling the liquid crystal panel 3, a light source board 6 mounted with point light sources 5 such as light emitting diodes, a light guide plate 7 for producing light in a planar manner by propagating the light emitted from the point light sources 5, and a reflection plate 8 disposed on the bottom surface of the light guide plate 7 and serves to reflect light toward the front side. A light source device includes the components of the liquid crystal display device other than the liquid crystal panel 3 and the circuit board 4.

The back frame 1 contains a metal having high thermal conductivity such as aluminum, stainless steel, iron, or copper. The back frame 1 may be either a single member or, if necessary, a combination of plural members. The front frame 2 contains a metal having high thermal conductivity such as aluminum, stainless steel, iron, or copper, plastics, or the like. In this embodiment, the case A includes the two members, that is, the back frame 1 and the front frame 2. If necessary, additional members may be used to form the case A.

In general, the liquid crystal panel 3 is configured in such a manner that a liquid crystal is injected between a pair of (i.e., top and bottom) glass substrates and sealed therein by a sealing member and that a pair of polarizing plates are bonded to the respective glass substrates. The liquid crystal panel 3 is connected to the circuit board 4 for driving and controlling the liquid crystal panel 3 via, for example, flexible boards which are mounted with driving IC chips etc.

The point light sources 5 include light emitting diodes, for example, which emit light of red, green, blue, white, or a halftone color between them. The number of point light sources 5 may be one. The color or the combination of colors of the point light sources 5 is determined in accordance with the purpose. In this embodiment, plural point light sources 5 are mounted on the light source board 6 straightly at regular intervals by soldering, for example.

The light source board 6 is provided with a wiring pattern for supplying power to the point light sources 5. The light source board 6 may include a glass epoxy board, a metal base board, a flexible board, or the like. The light source board 6 is disposed on an inside side surface of the back frame 1. Although in this embodiment the light source board 6 is disposed on one inside side surface, light source boards may be disposed on any of two to four inside side surfaces.

Although not shown in any drawings, in general, to improve the display performance, optical sheets such as a diffusion sheet, a prism sheet, and a polarizing reflection sheet or a plate-like light diffusion member is disposed between the liquid crystal panel 3 and the light guide plate 7.

Next, an attachment structure of the light source board 6 will be described with reference to FIGS. 2A and 2B which are a perspective view of a substantial part (cut by a plane) and a sectional view of a substantial part, respectively, of the liquid crystal display device of FIG. 1.

Figure 2A:
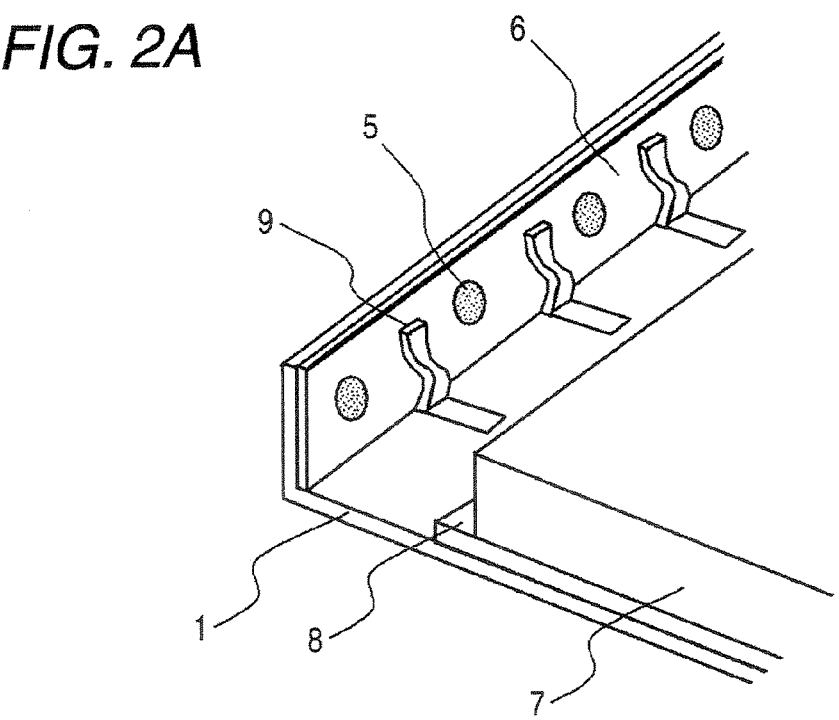
FIG. 2A is a perspective view of a substantial part (cut by a plane) and FIG. 2B is a sectional view of a substantial part of the liquid crystal display device according to the first embodiment of the invention.
Figure 2B:
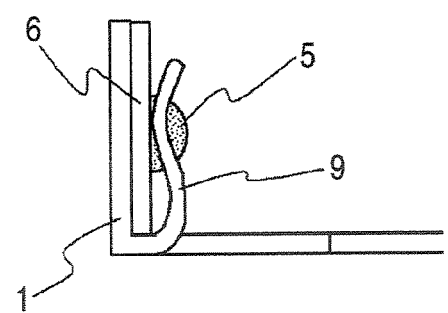

As shown in FIGS. 2A and 2B, plural holding members 9 having elasticity and S-shapes are provided by cutting and raising the bottom wall of the back frame 1 by press working or the like at adjacent portions where the light source board 6 to be disposed, and arranged in the longitudinal direction of the light source board 6. The holding members 9 are respectively disposed between the point light sources 5, and hold the light source board 6 between the side wall of the back frame 1 and themselves.

Since the holding members 9 are formed by cutting and raising portions of the bottom wall of the back frame 1 and hence are integral with the back frame 1, the number of components does not increase. Furthermore, the holding members 9 do not require spaces for screw heads or increase in the thickness of the back frame 1 as would be required if the light source board 6 were screwed to the inside side surface of the back frame 1. As such, the holding members 9 make it possible to reduce the width of a frame or the thickness of the back frame 1 without increasing the number of components.

Since the back frame 1 contains a metal having high thermal conductivity such as aluminum, stainless steel, iron, or copper, the back frame 1 functions as a heat radiating means and hence can efficiently radiate heat generated by the light source board 6.

The light source board 6 may be attached to the back frame 1 by using a grease, an adhesive, or the like which exhibits high thermal conductivity in addition to the holding members 9. In this case, the light source board 6 can be brought into close contact with the back frame 1 more reliably and the heat radiation can thus be increased. Even if the adhesive peels off as time elapses, positional deviation of the light source board 6 can be prevented because the light source board 6 is held between the back frame 1 and the holding members 9.

Figure 3:
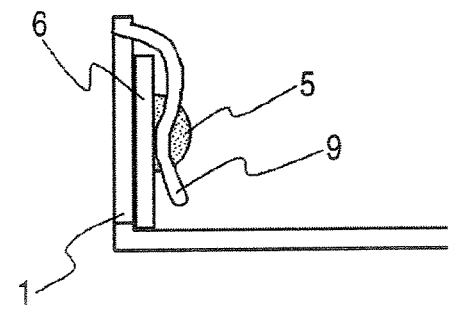
FIG. 3 is a sectional view of a substantial part of another liquid crystal display device according to the first embodiment of the invention.

As shown in FIG. 3, holding members 9 may be formed by cutting and raising portions of a side wall of the back frame 1 rather than its bottom wall, in which case the same advantages as described above can be obtained.

Figure 4:
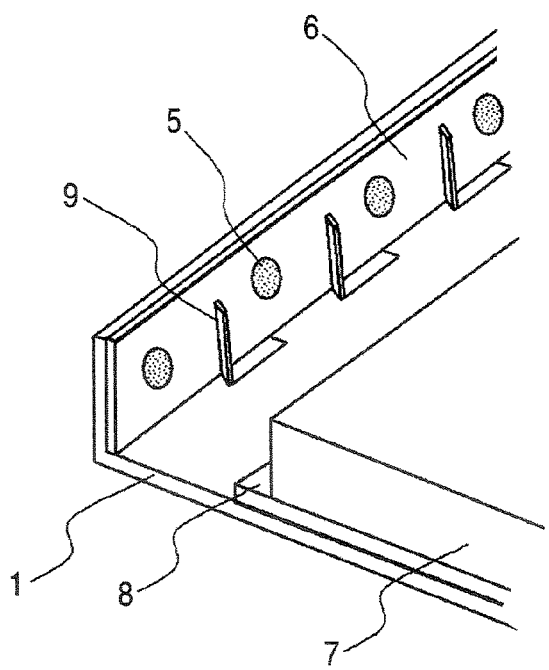
FIG. 4 is a perspective view of a substantial part (cut by a plane) of another liquid crystal display device according to the first embodiment of the invention.

As shown in FIG. 4, holding members 9 may be formed by cutting, in a direction approximately parallel with the surface of the light source board 6, and raising portions of the bottom wall of the back frame 1. In this case, the same advantages as described above can be obtained by orientating the holding members 9 in such a manner that they are somewhat inclined from the planes perpendicular to the inside side surface of the back frame 1 so as to exert elastic force on it.

Figure 5A:
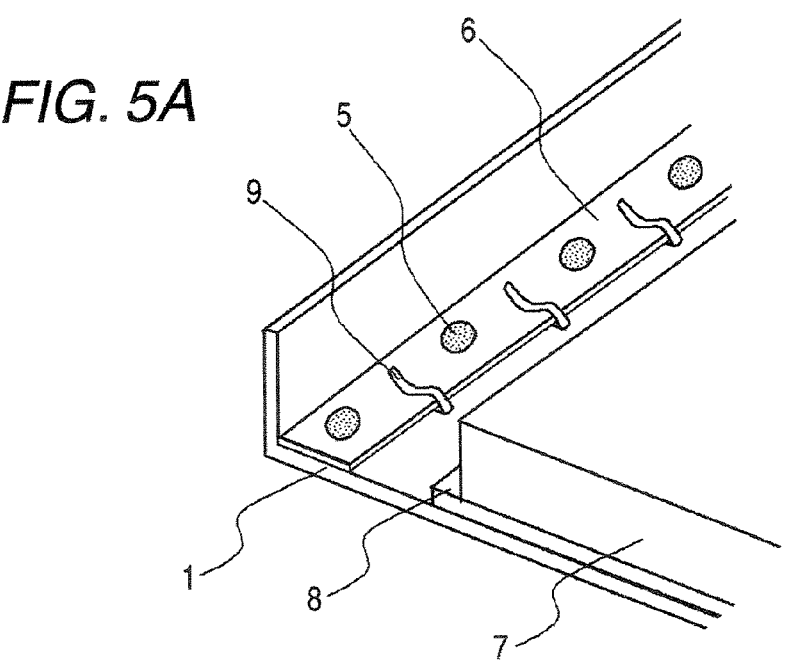
FIG. 5A is a perspective view of a substantial part (cut by a plane) and FIG. 5B is a sectional view of a substantial part of still another liquid crystal display device according to the first embodiment of the invention.
Figure 5B:
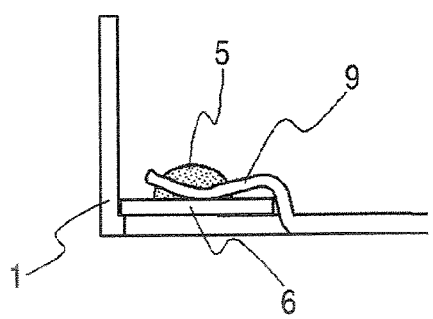
Figure 6:
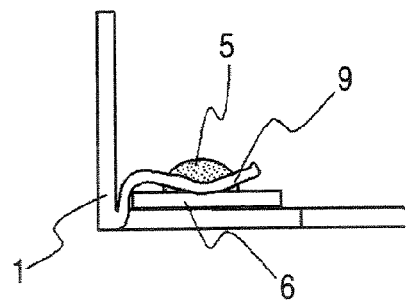
FIG. 6 is a sectional view of a substantial part of yet another liquid crystal display device according to the first embodiment of the invention.
Figure 7:
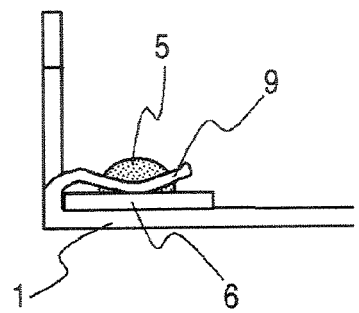
FIG. 7 is a sectional view of a substantial part of a further liquid crystal display device according to the first embodiment of the invention.

FIGS. 5A and 5B show another manner of disposition of the light source board 6 etc. That is, the light source board 6 may be disposed on the inside bottom surface of the back frame 1. In this case, holding members 9 are formed by cutting and raising portions of the bottom wall of the back frame 1. The holding members 9 includes a base end portions located close to the longitudinal side of the light source board 6 opposite to the longitudinal side adjacent to the side surface of the back frame 1, and hold the light source board 6 between the bottom wall of the back frame 1 and themselves. Alternatively, as shown in FIG. 6, the base end portions of holding members 9 may be located on the side of the side surface of the back frame 1. As a further alternative, as shown in FIG. 7, holding members 9 may be formed by cutting and raising portions of the side wall of the back frame 1. The above configurations make it possible to hold the light source board 6 between the bottom wall of the back frame 1 and the holding members 9 without increasing the number of components, and hence can reduce the thickness of the back frame 1.

In the first embodiment, the only requirement that the holding members 9 should satisfy is that they be configured so as to hold the light source board 6 between an inside surface of the back frame 1 and themselves. The shape, number, and locations of the holding members 9 can be changed as design-related items in accordance with the purpose.

Although in FIGS. 1 to 7 the holding members 9 are formed in the back frame 1, holding members 9 may be formed in the front frame 2. Also in the latter case, the width of a frame or the thickness of the front frame 2 can be reduced without increasing the number of components as long as the holding members 9 are configured so as to hold the light source board 6 between an inside surface of the front frame 2 and themselves.

Embodiment 2

Figure 8:
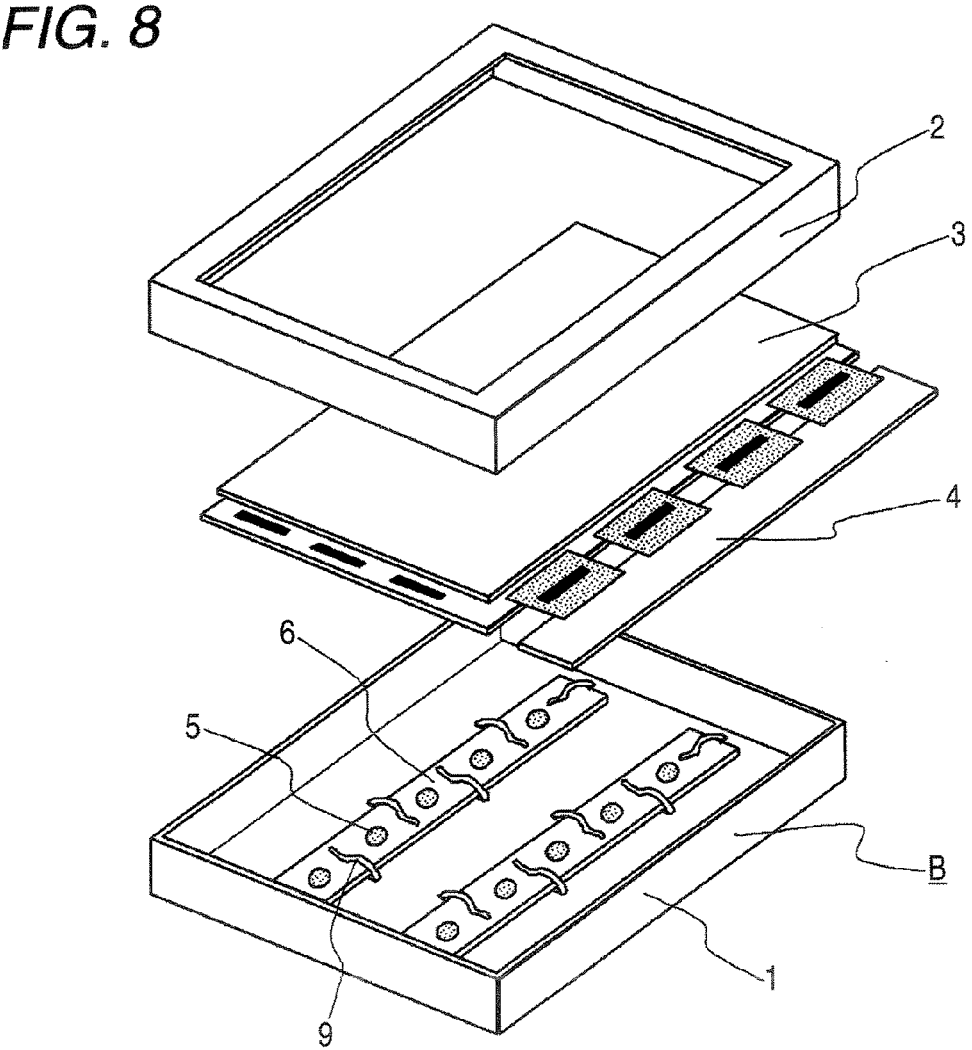
FIG. 8 is an exploded perspective view showing a general configuration of a liquid crystal display device according to a second embodiment of the invention.

FIG. 8 is an exploded perspective view showing a general configuration of a liquid crystal display device according to a second embodiment of the invention. In the drawings, the same or equivalent portions are denoted by the same reference symbol.

The second embodiment is directed to a direct light type light source unit without a light guide plate 7. As shown in FIG. 8, a case B includes two members, that is, a back frame 1 and a front frame 2. If necessary, additional members may be used to form the case B. Light source boards 6 are disposed on the inside bottom surface of the back frame 1. Although in this embodiment the two light source boards 6 are provided, the invention is not limited to such a case.

Next, an attachment structure of the light source boards 6 will be described with reference to FIGS. 9A and 9B which are a perspective view of a substantial part (cut by a plane) and a sectional view of a substantial part, respectively, of the liquid crystal display device of FIG. 8.

Figure 9A:
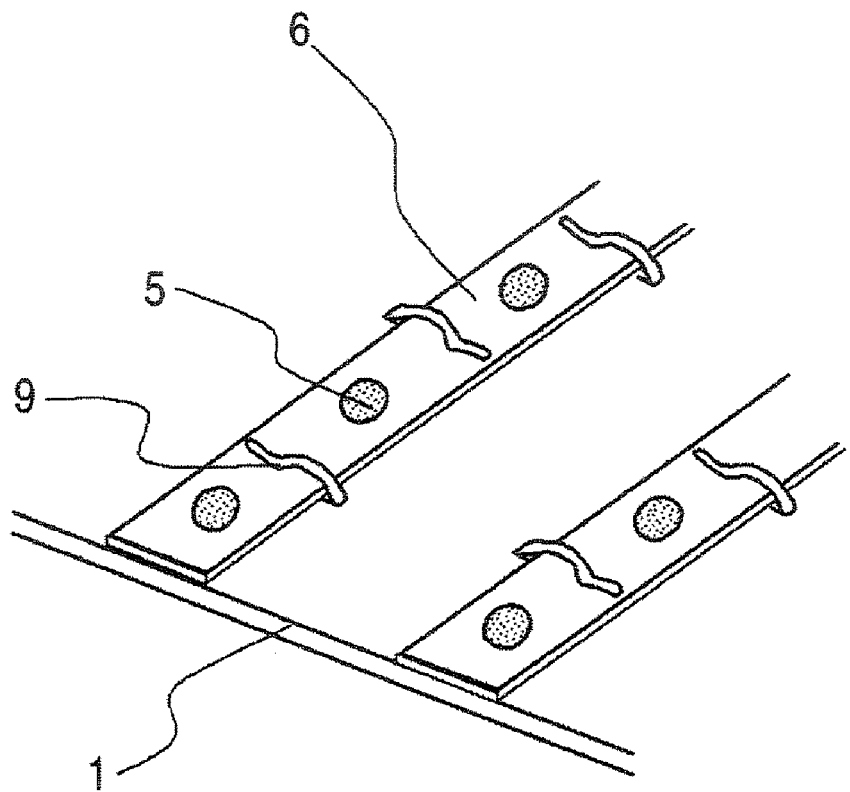
FIG. 9A is a perspective view of a substantial part (cut by a plane) and FIG. 9B is a sectional view of a substantial part of the liquid crystal display device according to the second embodiment of the invention.
Figure 9B:
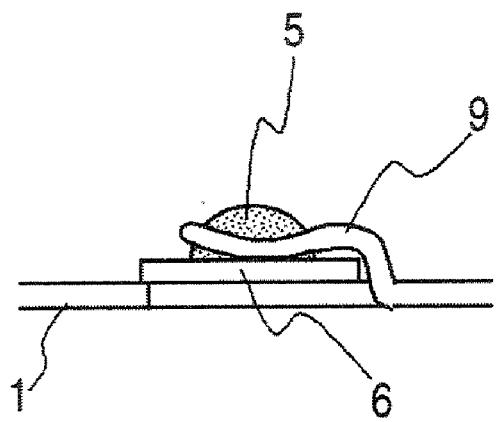

As shown in FIGS. 9A and 9B, plural holding members 9 having elasticity and S-shapes are provided by cutting and raising the bottom wall of the back frame 1 by press working or the like at adjacent portions where the light source boards 6 to be disposed, and arranged in the longitudinal direction of the light source boards 6. The holding members 9 are respectively disposed between the point light sources 5, and hold each light source board 6 between the bottom wall of the back frame 1 and themselves. Although in this embodiment the base end portions of the holding members 9 are located close to the four sidelines of each light source board 6, the base portions may be provided close to any of one to three sidelines of each light source board 6. Although in this embodiment the base portions of the holding members 9 that are associated with the two longer sidelines of each light source board 6 are disposed to be close to the two longitudinal sides, alternately, they need not always be disposed in such a manner.

Also in the direct light type light source unit without a light guide plate 7, each light source board 6 can be held between the bottom wall of the back frame 1 and the holding members 9 without increasing the number of components, and hence the thickness of the back frame 1 can be reduced. The same advantages as in the first embodiment can thus be obtained.

Embodiment 3

Figure 10:
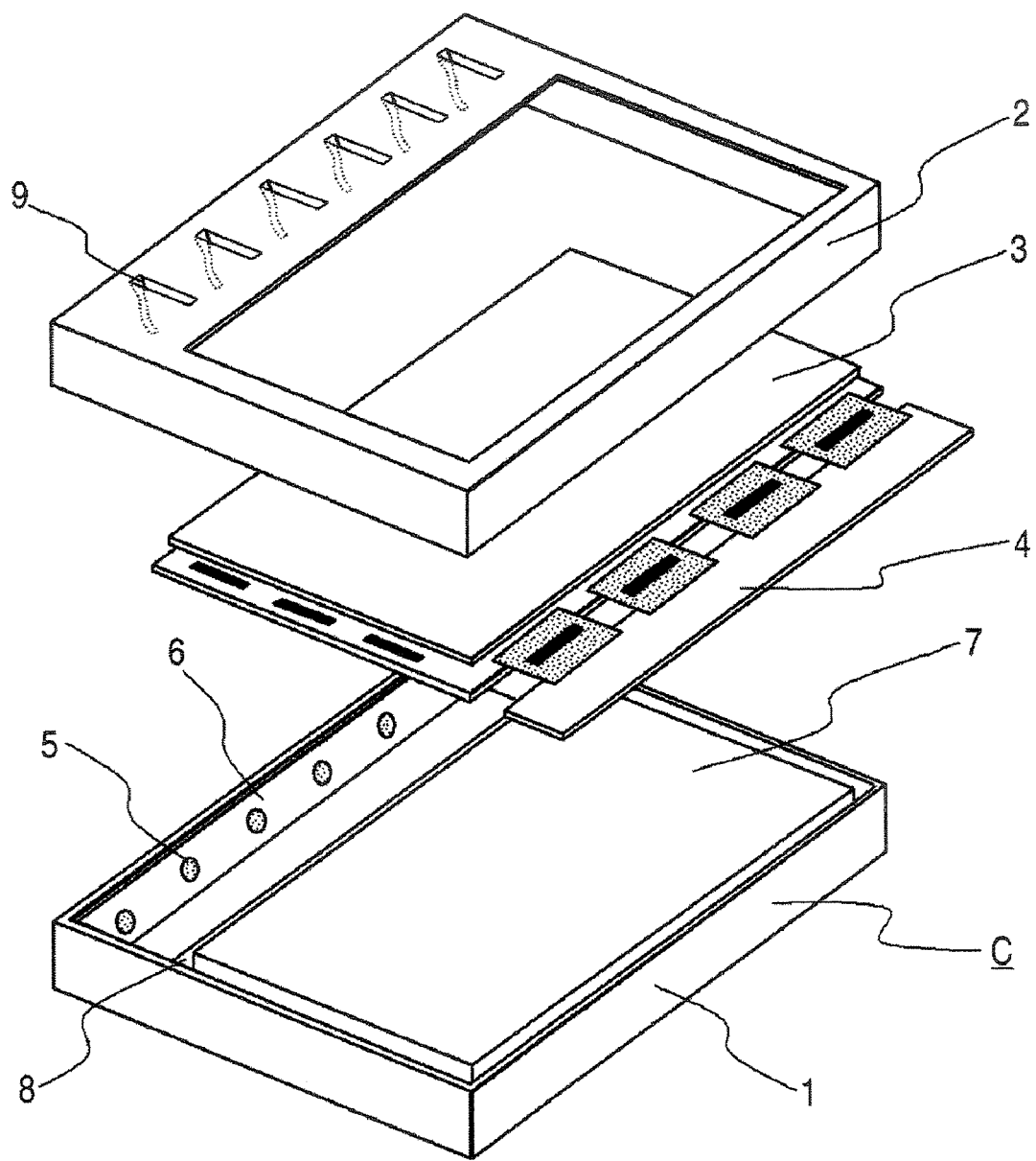
FIG. 10 is an exploded perspective view showing a general configuration of a liquid crystal display device according to a third embodiment of the invention.

FIG. 10 is an exploded perspective view showing a general configuration of a liquid crystal display device according to a third embodiment of the invention. In the drawings, the same or equivalent portions are denoted by the same reference symbol.

As shown in FIG. 10, a case C includes two members, that is, a back frame 10 and a front frame 11. If necessary, additional members may be used to form the case C. A light source board 6 is disposed on an inside side surface of the back frame 10. On the other hand, the front frame 11 is formed with holding members 9.

Next, an attachment structure of the light source board 6 will be described with reference to FIGS. 11A and 11B which are a perspective view of a substantial part (cut by a plane) and a sectional view of a substantial part, respectively, of the liquid crystal display device of FIG. 10.

Figure 11A:
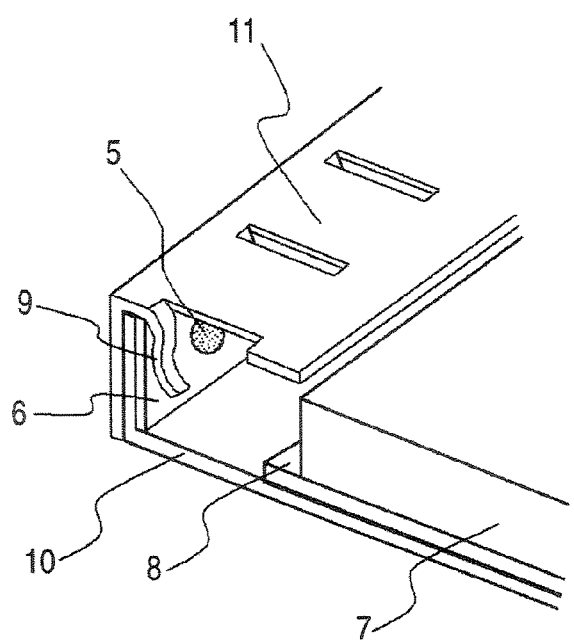
FIG. 11A is a perspective view of a substantial part (cut by a plane) and FIG. 11B is a sectional view of a substantial part of the liquid crystal display device according to the third embodiment of the invention.
Figure 11B:
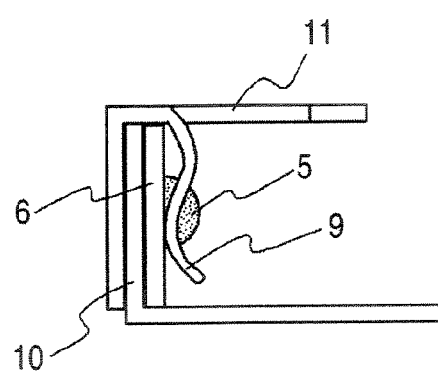

As shown in FIGS. 11A and 11B, plural holding members 9 having elasticity and S-shapes are provided by cutting and raising portions of the front wall of the front frame 11 by press working or the like at adjacent portions where the light source board 6 to be disposed, and arranged in the longitudinal direction of the light source board 6. The holding members 9 is disposed between the point light sources 5, and hold the light source board 6 between the side wall of the back frame 10 and themselves.

Since the back frame contains a metal having high thermal conductivity such as aluminum, stainless steel, iron, or copper, the back frame 10 functions as a heat radiating means and hence can efficiently radiate heat generated by the light source board 6.

The above configuration allows the light source board 6 to be held between the side wall of the back frame 10 and the holding members 9 without increasing the number of components, and hence can reduce the width of a frame and the thickness of the back frame 10.

Figure 12:
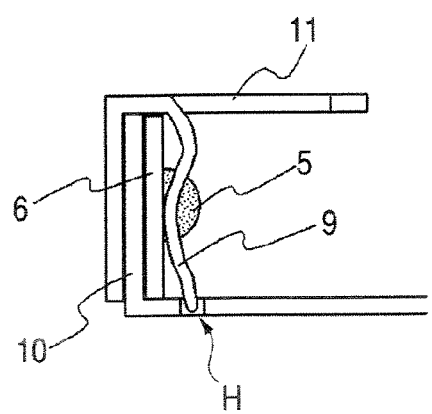
FIG. 12 is a sectional view of a substantial part of another liquid crystal display device according to the third embodiment of the invention.

As shown in FIG. 12, holes H for receiving the tips of the holding members 9 may be formed in the bottom wall of the back frame 10. In this case, since the tips of the holding members 9 are fixed, the light source board 6 can be held more stably.

Figure 13:
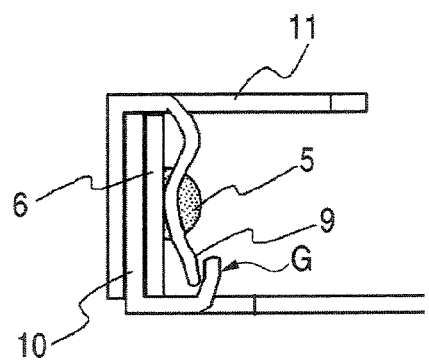
FIG. 13 is a sectional view of a substantial part of another liquid crystal display device according to the third embodiment of the invention.

As shown in FIG. 13, cut-and-raised portions G for receiving the tips of the holding members 9 may be formed in the bottom wall of the back frame 10. In this case, since the tips of the holding members 9 are prevented from going away from the inside side surface of the back frame 10, the light source board 6 can be held more stably.

Figure 14A:
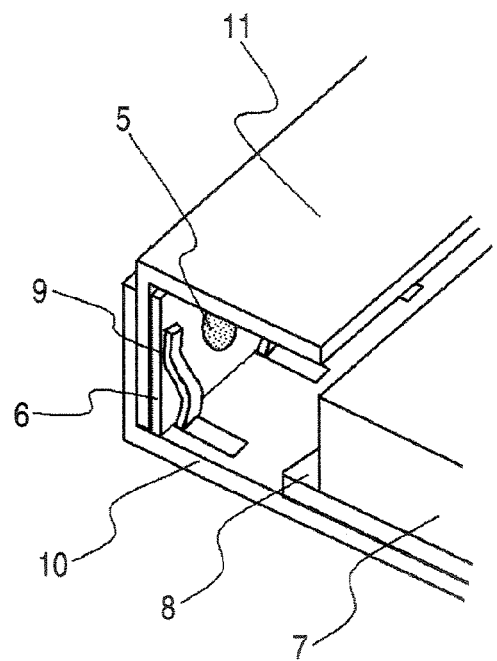
FIG. 14A is a perspective view of a substantial part (cut by a plane) and FIG. 14B is a sectional view of a substantial part of still another liquid crystal display device according to the third embodiment of the invention.
Figure 14B:
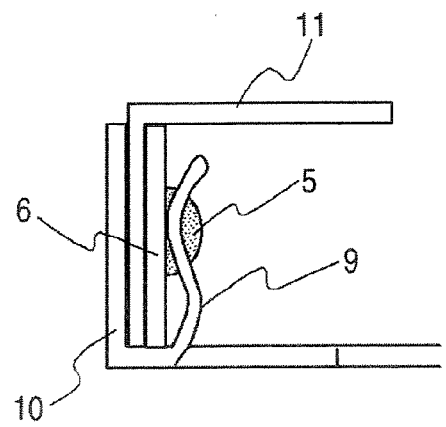

FIGS. 14A and 14B show another manner of disposition of the light source board 6 in the third embodiment, in which the light source board 6 is disposed on an inside side surface of the front frame 11. In this case, holding members 9 are formed in the back frame 10. The holding members 9 have, for example, S-shapes by cutting and raising portions of the bottom wall of the back frame 10 so as to exert elastic force on the inside side surface of the front frame 11. The holding members 9 hold the light source board 6 between the side wall of the front frame 11 and themselves.

In case that the light source board 6 is disposed on an inside side surface of the front frame 11, heat generated by the light source board 6 can be radiated efficiently because the front frame 11 contains a metal having high thermal conductivity such as aluminum, stainless steel, ion, or copper and hence functions as a heat radiating means.

The above configuration allows the light source board 6 to be held between a side wall of the front frame 11 and the holding members 9 without increasing the number of components, and hence can reduce the width of a frame and the thickness of the front frame 11.

Figure 15:
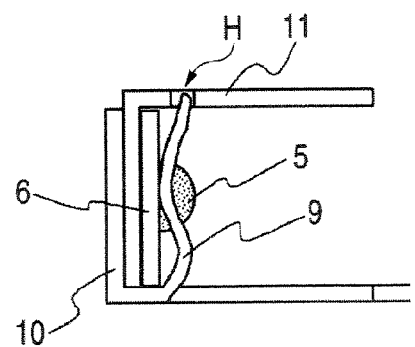
FIG. 15 is a sectional view of a substantial part of yet another liquid crystal display device according to the third embodiment of the invention.

As shown in FIG. 15, holes H for receiving the tips of the holding members 9 may be formed in the front frame 11. In this case, since the tips of the holding members 9 are fixed, the light source board 6 can be held more stably.

Figure 16:
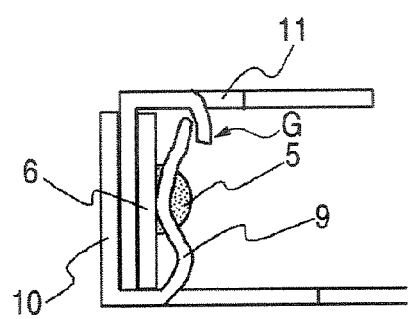
FIG. 16 is a sectional view of a substantial part of a further liquid crystal display device according to the third embodiment of the invention.

As shown in FIG. 16, cut-and-raised portions G for receiving the tips of the holding members 9 may be formed in the front frame 11. In this case, since the tips of the holding members 9 are prevented from going away from the inside side surface of the front frame 11, the light source board 6 can be held more stably.

In the third embodiment, the only requirement that the holding members 9 formed in the back frame 10 or the front frame 11 should satisfy is that they be configured so as to hold the light source board 6 between a side wall of the other frame and themselves. The shape, number, and locations of the holding members 9 can be changed as design-related items in accordance with the purpose. The other part of the configuration and the other advantages are the same as in the first and second embodiments.

Embodiment 4

Figure 17:
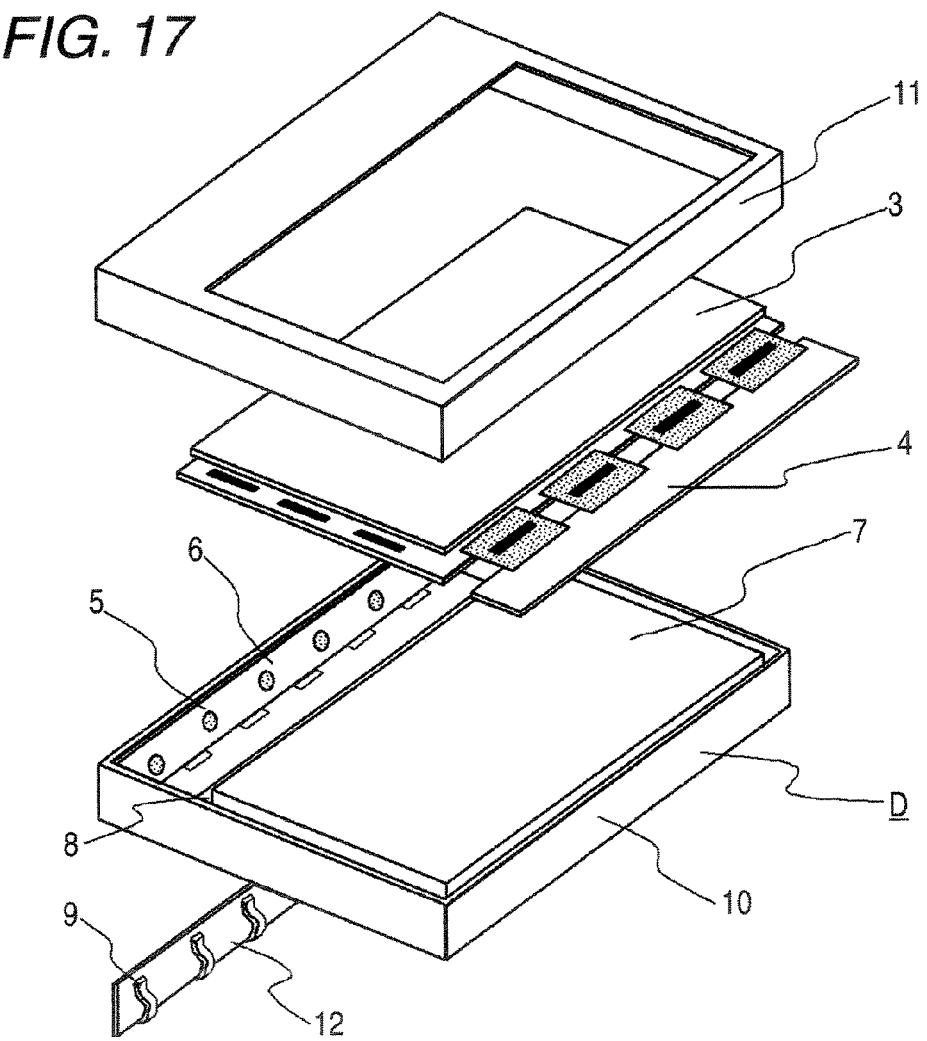
FIG. 17 is an exploded perspective view showing a general configuration of a liquid crystal display device according to a fourth embodiment of the invention.

FIG. 17 is an exploded perspective view showing a general configuration of a liquid crystal display device according to a fourth embodiment of the invention. In the drawings, the same or equivalent portions are denoted by the same reference symbol.

As shown in FIG. 17, a case D includes three members, that is, a back frame 10, a front frame 11, and a holding plate 12. If necessary, additional members may be used to form the case D. The holding plate 12 contains a metal having high thermal conductivity such as aluminum, stainless steel, iron, or copper, plastics, or the like. A light source board 6 is disposed on an inside side surface of the back frame 10.

Next, an attachment structure of the light source board 6 will be described with reference to FIGS. 18A and 18B which are a perspective view of a substantial part (cut by a plane) and a sectional view of a substantial part, respectively, of the liquid crystal display device of FIG. 17.

Figure 18A:
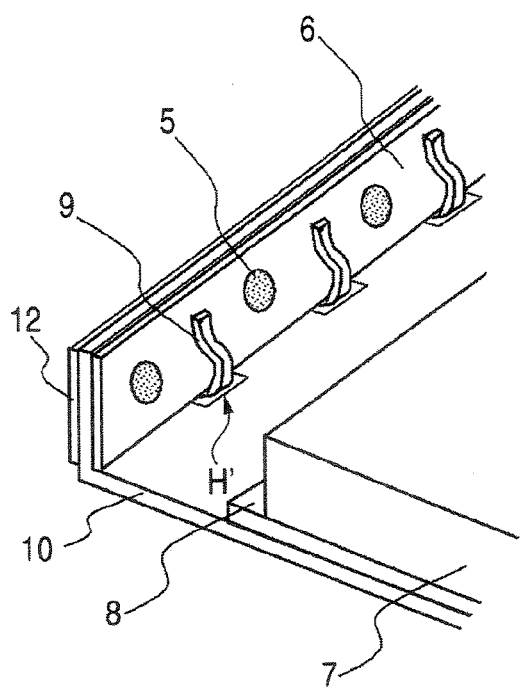
FIG. 18A is a perspective view of a substantial part (cut by a plane) and FIG. 18B is a sectional view of a substantial part of the liquid crystal display device according to the fourth embodiment of the invention.
Figure 18B:
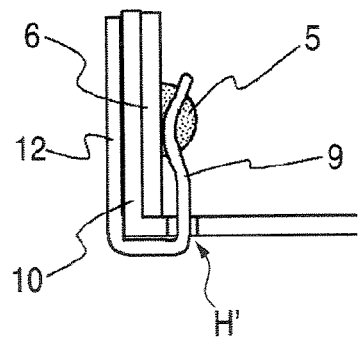

As shown in FIGS. 18A and 18B, the holding plate 12 is disposed on an outer side surface of the back frame 10. The holding plate 12 is provided with plural holding members 9 having elasticity and S-shapes are provided by bending projections of the holding plate 12 and are arranged in the longitudinal direction of the light source board 6. The holding members 9 are inserted through holes H' formed in the bottom wall of the back frame 10. The holding members 9 are disposed between the point light sources 5, and hold the light source board 6 between the side wall of the back frame 10 and themselves.

When the holding plate 12 contains a metal having high thermal conductivity such as aluminum, stainless steel, iron, or copper rather than plastics, the holding plate 12 can function as a heat radiating means.

Figure 19:
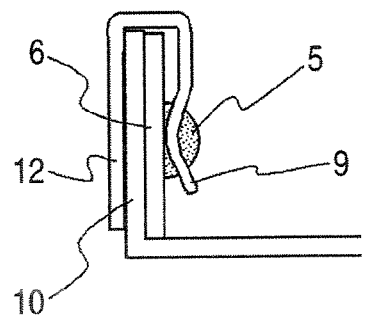
FIG. 19 is a sectional view of a substantial part of another liquid crystal display device according to the fourth embodiment of the invention.

In the fourth embodiment, the only requirement that the holding members 9 of the holding plate 12 should satisfy is that they be configured so as to hold the light source board 6 between a side wall of the back frame 10 and themselves. The same advantages can be obtained also in the case where, for example, the holding members 9 are introduced from the front side of back frame 10 as shown in FIG. 19. The shape, number, and locations of the holding members 9 can be changed as design-related items in accordance with the purpose. The other part of the configuration and the other advantages are the same as in the first to third embodiments.

Figure 20:
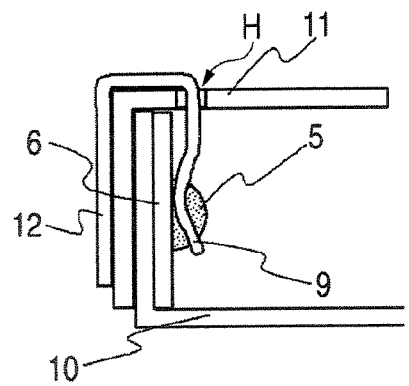
FIG. 20 is a sectional view of a substantial part of still another liquid crystal display device according to the fourth embodiment of the invention.

FIG. 20 shows another manner of disposition of the holding plate 12, in which, for example, the holding plate 12 is disposed on an outside side surface of the front frame 11. The holding members 9 are inserted through holes H' formed in the front wall of the front frame 11. This configuration provides the same advantages as described above.

Figure 21:
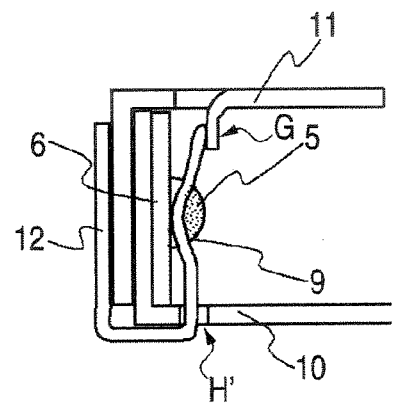
FIG. 21 is a sectional view of a substantial part of a further liquid crystal display device according to the fourth embodiment of the invention.

As shown in FIG. 21, another configuration is possible in which the holding plate 12 is disposed on an outside side surface of the front frame 11, the holding members 9 are inserted through holes H' formed in the bottom wall of the back frame 10, and the front frame 11 is formed with cut-and-raised portions G for receiving the tips of the holding members 9. In this case, since the tips of the holding members 9 are prevented from going away from the inside side surface of the back frame 10, the light source board 6 can be held more stably.

The fourth embodiment provides the same advantages as the first to third embodiments because the number of components of the case D is increased by only one (holding plate 12).

Embodiment 5

Figure 22A:
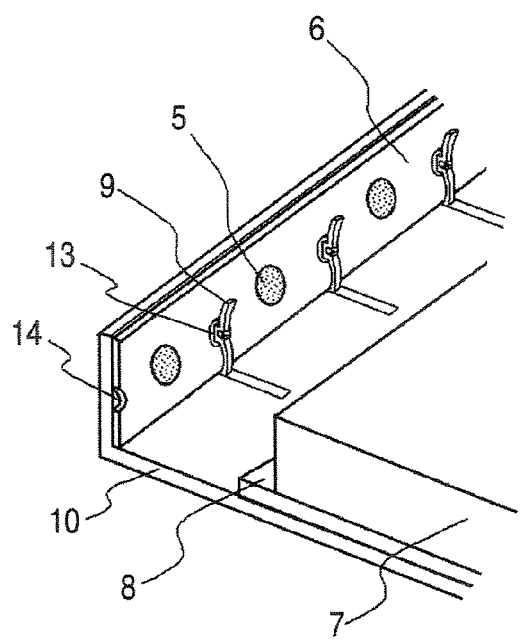
FIG. 22A is a perspective view of a substantial part (cut by a plane) and FIG. 22B is a sectional view of a substantial part of a liquid crystal display device according to a fifth embodiment of the invention.
Figure 22B:
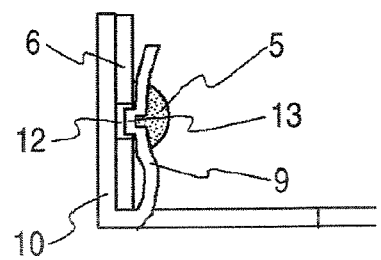

FIGS. 22A and 22B are a perspective view of a substantial part (cut by a plane) and a sectional view of a substantial part, respectively, of a liquid crystal display device according to a fifth embodiment of the invention. In the drawings, the same or equivalent portions are denoted by the same reference symbol.

As shown in FIGS. 22A and 22B, a light source board 6 is disposed on an inside side surface of the back frame 10.

Next, an attachment structure of the light source board 6 will be described. Plural holding members 9 having and S-shapes are provided by cutting and raising the bottom wall of the back frame 10 by press working or the like at adjacent portions where adjacent to the light source board 6 to be disposed, and are arranged in the longitudinal direction of the light source board 6. The holding members 9 are disposed between the point light sources 5, and hold the light source board 6 between the side wall of the back frame 10 and themselves.

Each holding member 9 has a projection 13. The light source board 6 is formed with hole-shaped positioning portions 14 between the point light sources 5. The projections 13 are located at such positions as to be able to engage the respective hole-shaped positioning portions 14 of the light source board 6. Engaging the projections 13 with the hole-shaped positioning portions 14 makes it possible to hold the light source board 6 at a desired position reliably without the need for using a positioning jig or the like.

Although in this embodiment the positioning portions 14 provided in the light source board 6 are shaped like a hole, the same advantage can be obtained by recess-shaped (i.e., non-penetrating) positioning portions.

Figure 23:
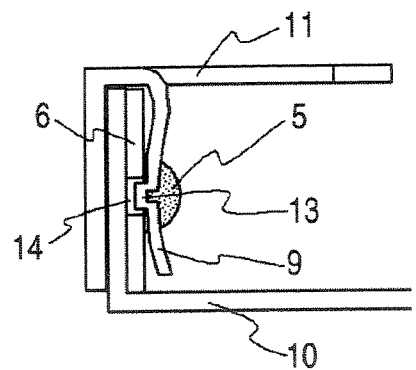
FIG. 23 is a sectional view of a substantial part of another liquid crystal display device according to the fifth embodiment of the invention.

In the fifth embodiment, satisfactory results are obtained as long as the holding members 9 having the projection 13 is provided in one of the back frame 10, the front frame 11, and the holding plate 12. For example, the same advantage can be obtained by a configuration in which, as shown in FIG. 23, the holding members 9 having the projection 13 are provided in the front frame 11 and hold the light source board 6 between a side wall of the back frame 10 and themselves. The shapes, numbers, and locations of the holding members 9, the projections 13, and the positioning portions 14 may be changed as design-related items in accordance with the purpose. The other part of the configuration and the other advantages are the same as in the first to fourth embodiments.

Embodiment 6

Figure 24A:
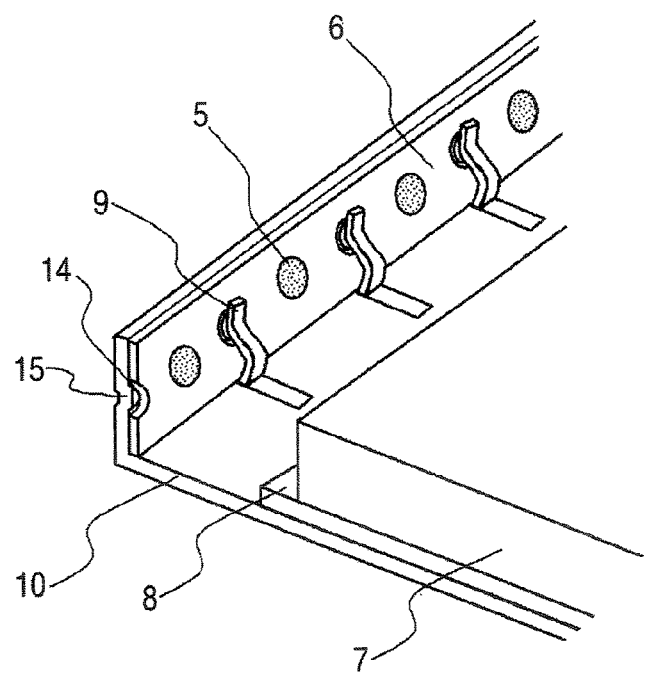
FIG. 24A is a perspective view of a substantial part (cut by a plane) and FIG. 24B is a sectional view of a substantial part of a liquid crystal display device according to a sixth embodiment of the invention.
Figure 24B:
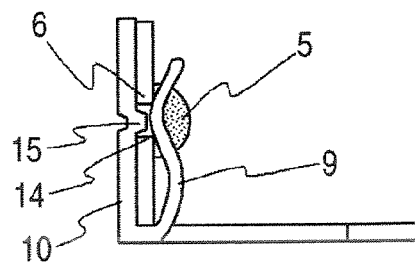

FIGS. 24A and 24B are a perspective view of a substantial part (cut by a plane) and a sectional view of a substantial part, respectively, of a liquid crystal display device according to a sixth embodiment of the invention. In the drawings, the same or equivalent portions are denoted by the same reference symbol.

As shown in FIGS. 24A and 24B, a light source board 6 is disposed on an inside side surface of the back frame 10.

Next, an attachment structure of the light source board 6 will be described. Plural holding members 9 having elasticity and S-shapes are provided by cutting and raising the bottom wall of the back frame 10 by press working or the like at adjacent portions where the light source board 6 to be disposed, and arranged in the longitudinal direction of the light source board 6. The holding members 9 are disposed between the point light sources 5, and hold the light source board 6 between the side wall of the back frame 10 and themselves.

The inside side surface of the back frame 10 is formed with convex positioning members 15 which are formed by press working or the like. The light source board 6 is formed with hole-shaped positioning portions 14 between the point light sources 5. The convex positioning members 15 are located at such positions as to be able to engage the respective hole-shaped positioning portions 14 of the light source board 6. The holding members 9 are located at such positions as to be able to engage the respective hole-shaped positioning portions 14. Engaging the hole-shaped positioning portions 14 with the convex positioning portions 15 makes it possible to hold the light source board 6 at a desired position reliably without the need for using a positioning jig or the like.

Although in this embodiment the positioning portions 14 provided in the light source board 6 are shaped like a hole, the same advantage can be obtained by recess-shaped (i.e., non-penetrating) positioning portions.

Although in this embodiment the holding members 9 are located at such positions as to be able to engage the respective hole-shaped positioning portions 14, the same advantage can be obtained even if they are located at different positions between the point light sources 5.

Figure 25:
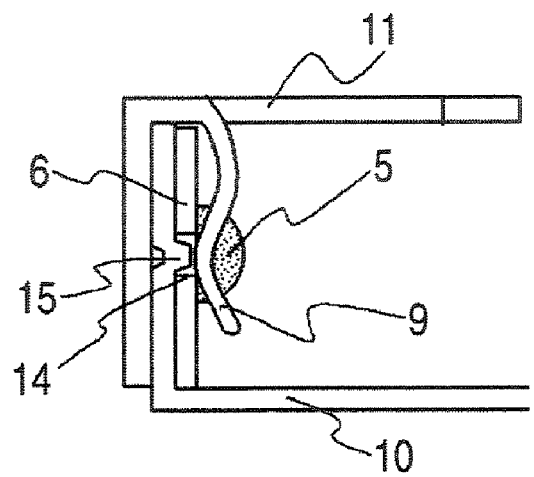
FIG. 25 is a sectional view of a substantial part of another liquid crystal display device according to the sixth embodiment of the invention.
Figure 26:
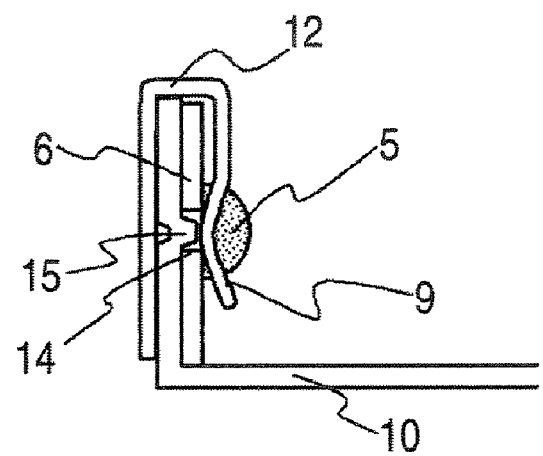
FIG. 26 is a sectional view of a substantial part of still another liquid crystal display device according to the sixth embodiment of the invention.

In the sixth embodiment, satisfactory results are obtained as long as the holding members 9 is provided in one of the back frame 10, the front frame 11, and the holding plate 12. For example, the same advantage can be obtained even if the holding members 9 are provided in the front frame 11 as shown in FIG. 25 or in the holding plate 12 as shown in FIG. 26. Satisfactory results are obtained as long as the positioning portions 15 are formed in the back frame 10 or the front frame 11 in an area where the light source board 6 is to be disposed. The shapes, numbers, and locations of the holding members 9, the positioning portions 14, and the positioning portions 14 may be changed as design-related items in accordance with the purpose. The other part of the configuration and the other advantages are the same as in the first to fifth embodiments.

In the above embodiments, the holding members 9 are formed by cutting and raising portions of the case or bending projections of the case. Where the frame which is formed with the holding members 9 contains plastics, the holding members 9 may be formed by press forming together with the frame in such a shape as to be given elasticity rather than cutting and raising or bending.

What is claimed is:

1. A liquid crystal display comprising:
 a light source unit;
 a liquid crystal display unit disposed on the light source unit for displaying images using the light radiated from the light source unit;
 wherein the light source unit includes;
  an elongated light source board mounted with a plurality of point light sources spaced in a longitudinal direction thereof;
  a case that houses the light source board; and
  a plurality of holding members that have a same material as the case and are disposed integrally with the case at a plurality of positions on an inner portion of the case to have elasticity toward a direction holding the light source board at positions on the light source board between the plurality of point light sources with the case.

2. The light source unit according to claim 1, wherein:
the case includes a back frame and a front frame, and
the holding members are formed on an inner wall of one of the back frame and the front frame.

3. The light source unit according to claim 1, wherein:
the case includes a back frame and a front frame, and
the holding members are formed on an inner wall of one of the back frame and the front frame to hold the light source board with the other frame.

4. The light source unit according to claim 1, wherein:
the case has a back frame, a front frame, and a holding plate, and
the holding members are formed on the holding plate, and the holding members hold the light source board with one of the back frame and the front frame.

5. The light source unit according to claim 1,
wherein the light source board has a hole-shaped or recess-shaped positioning portion that engages the holding members.

6. A liquid crystal display device comprising:
a light source unit; and
a liquid crystal display unit disposed on the light source unit for displaying images using the light radiated from the light source unit,
wherein the light source unit includes:
an elongated light source board mounted with a plurality of point light sources spaced in a longitudinal direction thereof;
a case that houses the light source board; and
a plurality of holding members that are disposed integrally with an inner wall of the case, and hold the light source board at positions between the plurality of point light sources with the case, the holding members including portions cut and raised from the case to have elasticity.

7. A liquid crystal display comprising:
a light source unit;
a liquid crystal display unit disposed on the light source unit for displaying images using the light radiated from the light source unit;
wherein the light source unit includes;
an elongated light source board having a first face;
a plurality of point light sources mounted on the first face of the light source board;
a case that houses the light source board; and
a holding member that is disposed integrally with an inner wall of the case, and holds the light source board at positions on the first face, between the plurality of point light sources, with the case, wherein the holding member extends from outside of an outer edge of the first face when viewed from a direction perpendicular to the first face.

8. The light source unit according to claim 7,
wherein the first face having a first outer edge and a second outer edge opposite to the first outer edge,
wherein the holding member extends from outside of the first outer edge in a direction from the first outer edge to the second outer edge when viewed from a direction perpendicular to the first face.

9. The light source unit according to claim 7,
wherein at least a part of the holding member contacts with the first face of the light source board.

10. The light source unit according to claim 7, wherein:
the case includes a back frame and a front frame, and
the holding member is formed on an inner wall of one of the back frame and the front frame.

11. The light source unit according to claim 7, wherein:
the case includes a back frame and a front frame, and
the holding member is formed on an inner wall of one of the back frame and the front frame to hold the light source board with the other frame.

12. The light source unit according to claim 7, wherein:
the case has a back frame, a front frame, and a holding plate, and
the holding member is formed on the holding plate, and the holding member holds the light source board with one of the back frame and the front frame.

13. The light source unit according to claim 7,
wherein the light source board has a hole-shaped or recess-shaped positioning portion that engages the holding member.

* * * * *